Figure 1:
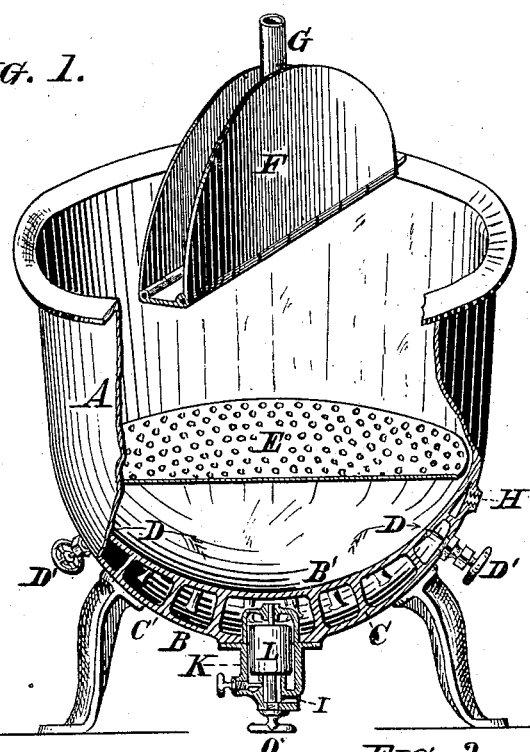
Figure 2:
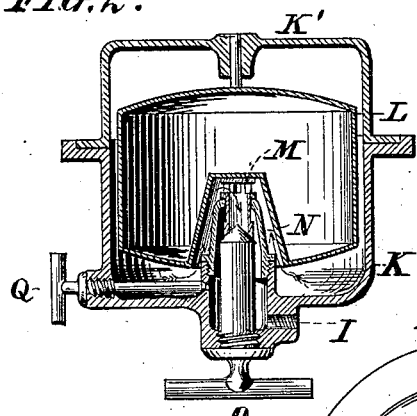
Figure 3:
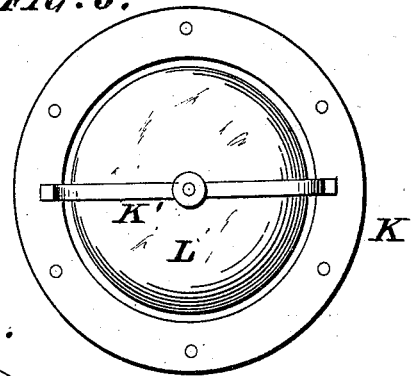
Figure 4:
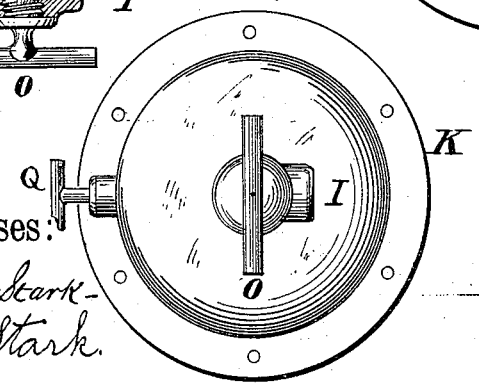

(No Model.)

H. W. DOPP.
JACKETED STEAM KETTLE FOR RENDERING FATS, BOILING SOAP, AND FOR OTHER USES.

No. 287,424. Patented Oct. 30, 1883.

Witnesses:
Michael J. Stark
Willie C. Stark

Inventor:
H. W. Dopp

UNITED STATES PATENT OFFICE.

HENRY W. DOPP, OF BUFFALO, NEW YORK.

JACKETED STEAM-KETTLE FOR RENDERING FATS, BOILING SOAP, AND FOR OTHER USES.

SPECIFICATION forming part of Letters Patent No. 287,424, dated October 30, 1883.

Application filed April 27, 1882. (No model.)

*To all whom it may concern:*

Be it known that I, HENRY W. DOPP, of Buffalo, in the county of Erie and State of New York, have invented certain new and useful Improvements in Jacketed Steam-Kettles for Rendering Fats, Boiling Soap, and for other Uses; and I do hereby declare that the following description of my said invention, taken in connection with the accompanying sheet of drawings, forms a full, clear, and exact specification, which will enable others skilled in the art to which it appertains to make and use the same.

My invention consists in arranging and constructing a steam jacketed kettle, pan, tub, or the like, so as to answer various purposes, and so that the discharge of the water from the condensed steam of the steam in the jacket shall be controlled automatically at the lower part of the steam-jacket by means of a float and balance-valve.

I refer to the accompanying drawings with letters of reference and specification, which explain my invention more fully.

Figure I represents my invention in a cast-iron kettle cast in one piece, shown in a perspective view having a section cut out to illustrate the steam-jacket and parts hereinafter to be mentioned. Fig. II is a section of the automatic water-discharge of steam-jacket B. Fig. III is a plan or top view of the automatic water-discharge shown in Fig. II. Fig. IV is a plan or bottom view of the automatic water-discharge shown in Fig. II.

A is a cast-iron kettle, with steam-jacket cast in one piece, and so constructed that the appearance of the inner and outer shape of the kettle will not vary from a single shell kettle or pan, with the exception of an opening left at the bottom in the center of the outer shell for renewing a skeleton core, which is to be inserted into the mold for a jacket-kettle, so that the melted iron, when poured into the mold, will surround the skeleton core, and so form two shells that will gradually run into one shell. Be it observed that by the use of a skeleton core a number of stays or connections, C C, are produced, uniting the two shells, so as to produce a jacketed kettle that will stand a pressure of one hundred and fifty pounds with safety and with comparatively light metal.

B B' are the inner and outer shells constituting the steam-jacket.

C C are a number of stays securing strength to the jacket B B.

D' D' are screw-valves secured into the outer shell of jacket B. These valves or their valve-spindle are provided on one end with a hand-wheel, and on the other end with a conical round shape, so as to fit into conical holes drilled in and through the inner shell at D D. The object of D' D' and D D is to enable the introduction of a steam jet or jets from the jacket into the inside of the kettle or the contents thereof, for purposes hereinafter to be mentioned.

E is a perforated false bottom or diaphragm, which may be removed or introduced at pleasure. Its object is to make the kettle applicable either for boiling or steaming purposes.

F are two semicircular covers to cover the top when the kettle is used as a steamer, in order to boil several kinds of vegetables at the same time, when placed on the false bottom E, which is arranged above the steam-jets D D.

G is a pipe to carry off any surplus of steam which might be obtained.

H is the steam-inlet, steam to be introduced from a steam-boiler.

I is a hole in the bottom of casing K, through which the condensed water from the steam-jacket makes its escape.

K is a casing provided with a flange that fits onto the opening in the center of outer shell, B. Said casing incloses the automatic water-discharge, which is composed of a float, L, to which a hollow valve is attached, somewhat resembling a short tube, being perforated around its circumference at the upper end. Through these openings the condensed water makes its escape. The lower end is left open. When the valve is closed it has its seats on the cone of stem O and cap N. A valve, M, is guided by N in sliding up or down when the float rises or falls. The two bearings or valve-seats before mentioned are obtained by the combination of M, N, and O. They are of equal area, and are therefore perfectly balanced, so that there is no pressure acting upon the valve when closed or open.

K' is a cross-bar secured to casing K. It serves to guide the float L when rising or falling.

O is a stem screwed through the lower body of casing K right beneath and centrally with M, N, and L. Its upper end is made conical, so that valve M can make its seat thereon. The lower end is provided with a handle or equivalent, so that at pleasure the conical top end or valve-seat may be withdrawn from the valve, to cause the condensed water, steam, or obstruction caused by residue left from the sand-core or the like within the jacket to be blown out through the valve M and outlet I.

Q is a stem similar to the stem O. It screws into the side of lower part of casing K, and is conical at the end nearest to the stem O. The compartment inclosing stem O is drilled through in order to make an outlet for residue collected below the level-line of valve M at the bottom of casing K. Q is designed to stop up this outlet or to open the same whenever it is thought desirable. If the sediments are to be blown off in this way, they make their escape through the discharge of the condensed water-outlet at letter I.

It will be observed that no inconvenience occurs from the steam-pressure within the jacket and casing K when either of the stems O or Q is withdrawn or opened in order to get rid of the sediments that clog up the condensed-water-discharge passage. Nor will there be any annoyance of live steam constantly blowing off from the jacket, as is the case when the discharge of the water is controlled by a common faucet or valve, for no person can regulate the discharge so nicely that the jacket will not be filled with water after a while, so that a constant stream of live steam will not issue from the jacket and the steam be only partially utilized.

To operate this steam-kettle, a few words will suffice. A steam-conduit is led from a steam-boiler to make connections at letter H. Sufficient steam is turned on just to answer the want. The discharge of condensed water takes care of itself. If the kettle is to be used for boiling water, rendering fats, boiling soap, or the like, the diaphragm E may be taken out. Should it be used as a steamer, the steam-jets D D are to be opened, &c.

Having thus fully described my invention, I wish to state that I am aware that modifications may be made without altering the nature of my invention.

What I desire to secure as new and useful to me by Letters Patent is—

1. The construction of the jacketed part of the kettle A, having stays securing the steam-jacket to the inner shell and a central opening in the bottom of the jacket, for the purpose specified.

2. The combination of a steam jacket kettle, pan, tub, or the like, with the steam-jets D D, passing from the steam-jacket through the inner shell, B, into the open kettle, for boiling, steaming, or rendering purposes, or in substance the same.

3. The combination, with a steam-jacketed kettle, of a false bottom, E, steam jet or jets D D, and controlling-valves D' D'.

4. The combination of the casing K with the jacket B.

5. The combination of casing K, float L, and valve M, with its seats N and O, to operate for purposes set forth.

6. The combination, with the valve M, the movable seat or stem O, and discharge-outlet I.

7. The combination of outlet I with valve-stem Q.

H. WM. DOPP.

Witnesses:
J. W. Dopp,
Wm. H. Dopp.